US009819163B1

(12) United States Patent
Winn

(10) Patent No.: US 9,819,163 B1
(45) Date of Patent: Nov. 14, 2017

(54) FLEXIBLE CABLE TRAY SECTION

(71) Applicant: WBT, LLC, Belleville, IL (US)

(72) Inventor: Richard Gregg Winn, Belleville, IL (US)

(73) Assignee: WBT, LLC, Belleville, IL (US)

( * ) Notice: Subject to any disclaimer, the term of this patent is extended or adjusted under 35 U.S.C. 154(b) by 0 days.

(21) Appl. No.: 14/971,237

(22) Filed: Dec. 16, 2015

(51) Int. Cl.
| F16L 3/00 | (2006.01) |
| H02G 3/04 | (2006.01) |
| F16L 3/10 | (2006.01) |
| F16L 3/23 | (2006.01) |
| F16L 3/26 | (2006.01) |

(52) U.S. Cl.
CPC .............. *H02G 3/0406* (2013.01); *F16L 3/10* (2013.01); *F16L 3/23* (2013.01); *F16L 3/26* (2013.01)

(58) Field of Classification Search
CPC .......... H02G 3/32; H02G 3/30; H02G 3/0608; H02G 3/26; H02G 3/0456; H02G 3/263; H02G 3/0418; H02G 3/22; H02G 3/0437; H02G 3/0443; H02G 11/00; H02G 3/0487; H02G 11/006; H02G 3/045; H02G 3/0431; F16L 55/035; F16L 3/22; F16L 3/13; F16L 3/222; F16L 3/04; F16L 3/221; F16L 3/233; F16L 3/23; F16L 3/227; F16L 3/1075; F16L 3/26; F16L 3/137; F16L 3/02; F16L 3/127; F16L 3/12; F16L 3/00
USPC .......................... 248/49, 62, 63, 68.1; 211/26
See application file for complete search history.

(56) References Cited

U.S. PATENT DOCUMENTS

| 2,684,512 | A * | 7/1954 | Beman .................. H01B 7/0045 |
| | | | 174/72 A |
| 3,321,571 | A * | 5/1967 | Lynch ..................... H02G 3/045 |
| | | | 174/101 |
| 4,840,023 | A * | 6/1989 | Borsani .................... F16G 13/10 |
| | | | 248/49 |
| 5,839,702 | A | 11/1998 | Jette |
| 6,019,323 | A | 2/2000 | Jette |
| 6,076,779 | A * | 6/2000 | Johnson ............... H02G 3/0437 |
| | | | 248/49 |
| 6,361,000 | B1 | 3/2002 | Jette |
| 6,460,812 | B1 | 10/2002 | Jette |
| 6,470,129 | B1 * | 10/2002 | Wentworth .......... H02G 3/0437 |
| | | | 385/134 |
| 6,637,704 | B2 | 10/2003 | Jette |
| 6,926,236 | B2 | 8/2005 | Jette |
| 7,049,521 | B2 * | 5/2006 | Marcotte ............. H02G 3/0475 |
| | | | 174/100 |

(Continued)

OTHER PUBLICATIONS

Legrand Cablofil Horizontal Tee Bridge (Cross-Over), http://www.legrand.ca/cablofil/cable-tray-wire-mesh/cable-tray/htbxxx-xxx.aspx#.VgwsS-xVhBc, Sep. 30, 2015.

(Continued)

*Primary Examiner* — Steven Marsh
(74) *Attorney, Agent, or Firm* — Nyemaster Goode, P.C.

(57) ABSTRACT

A flexible cable tray adapted to connect to cable tray sections. The flexible cable tray includes a base and flexible side walls, all of which are bendable to be adapted to support and guide cables to and from their intended locations through intersections, over beams and/or under beams, and may also be used as a vertical offset. The side walls may be laid flat to the base to enable easy shipment or bent inwardly to provide further support for the cables.

20 Claims, 7 Drawing Sheets

(56) References Cited

U.S. PATENT DOCUMENTS 9,074,707 B2 7/2015 Jette
2003/0015627 A1* 1/2003 Van Scoy ............... F16G 13/16
248/49

OTHER PUBLICATIONS

Legrand Cablofil Horizontal Gross Bridge (Cross-Over), http://www.legrand.ca/cablofil/cable-tray-wire-mesh/cable-tray/hxbxxx-xxx.aspx#.VgwsLuxVhBc, Sep. 30, 2015.
www.snaketray.com, Snake Tray Hand Bendable Cable Tray for Under Floors, Overhead and Walls, Sep. 2012, Document No. MKTG-0070, USA.

* cited by examiner

FLEXIBLE CABLE TRAY SECTION

BACKGROUND

This invention relates generally to cable tray systems used to support electrical wiring, cables, conduit and data transmission lines (collectively "cables"), and more particularly to junctions which connect two or more cable tray components.

Cable trays systems generally provide support for cables as the cables extend from a first location to a second location. Cable tray systems can be comprised of metal, plastic, or other suitable types of materials. One exemplary type of cable tray is referred to as a "mesh" or "basket" cable tray. These types of cable trays are comprised of interconnected metal bars or wires. Most mesh cable trays include space apart U-shaped cross members which are connected by lateral support members. The cables are generally supported by the bottom portion of the cross members as the cable tray system carries the cable from one point to another point.

Most cable trays are adapted to join with one or more other cable trays at intersections such as T-intersections or four-way intersections to create the cable tray system. Further, sometimes a radius or bend section is necessary to allow a single cable tray to turn a corner. Other accessories used to connect portions of a cable tray system include reduces, benders, risers, and cross pieces. Collectively, these various accessories are sometimes referred to herein as "accessory sections."

Most mesh or basket cable trays are designed to be field configured out of straight sections, meaning no accessory sections exist. For the few that do, they are bulky and expensive to ship in that they are created as a single section at the factory, and difficult to assemble/install.

Another problem with typical cable tray sections is that they are difficult to install when ceiling beams, pipes, and other obstructions are present. While the prior art describes the use of a "ladder" system that can be installed in a stair-step manner to get around such obstructions, the sections are rigid and of a predetermined length, and therefore cannot be easily configured to get around obstructions. There is therefore a need in the art for a cable tray apparatus which overcomes these and other deficiencies in the prior art.

SUMMARY

The present invention relates to an improved cable tray section that is flexible to allow it to easily bend over or under obstructions, such as ceiling beams and pipes. In some embodiments the flexible cable tray section starts with one end at a particular elevation, bends over or under an obstruction, then returns the second end to the original elevation. In other embodiments the flexible cable tray section starts with one end at a particular elevation then bends along its length (typically upward or downward) so that the second end is positioned at a different elevation.

The flexible tray consists of a generally rectangular flat base and one or more generally vertical side walls or tabs. The base includes end portions which can extend toward and combined with adjoining tray sections. In one embodiment the ends of the flexible tray section are adapted to connect to any cross bar portion in the adjoining cable try. Positioning the ends of the flexible cable tray farther apart reduces the curvature of the flexible tray and positioning the ends of the flexible cable tray closer together increases the curvature of the flexible tray.

The vertical side walls of the improved cable tray section are flexible so that their angle relative to the base portion can be changed. This allows them to be laid flat on the base to allow for easy shipping and transportation. Bending the vertical side walls toward the base may also provide additional support for the cables as the sections bend or vertically change.

DETAILED DESCRIPTION

Figure 6:
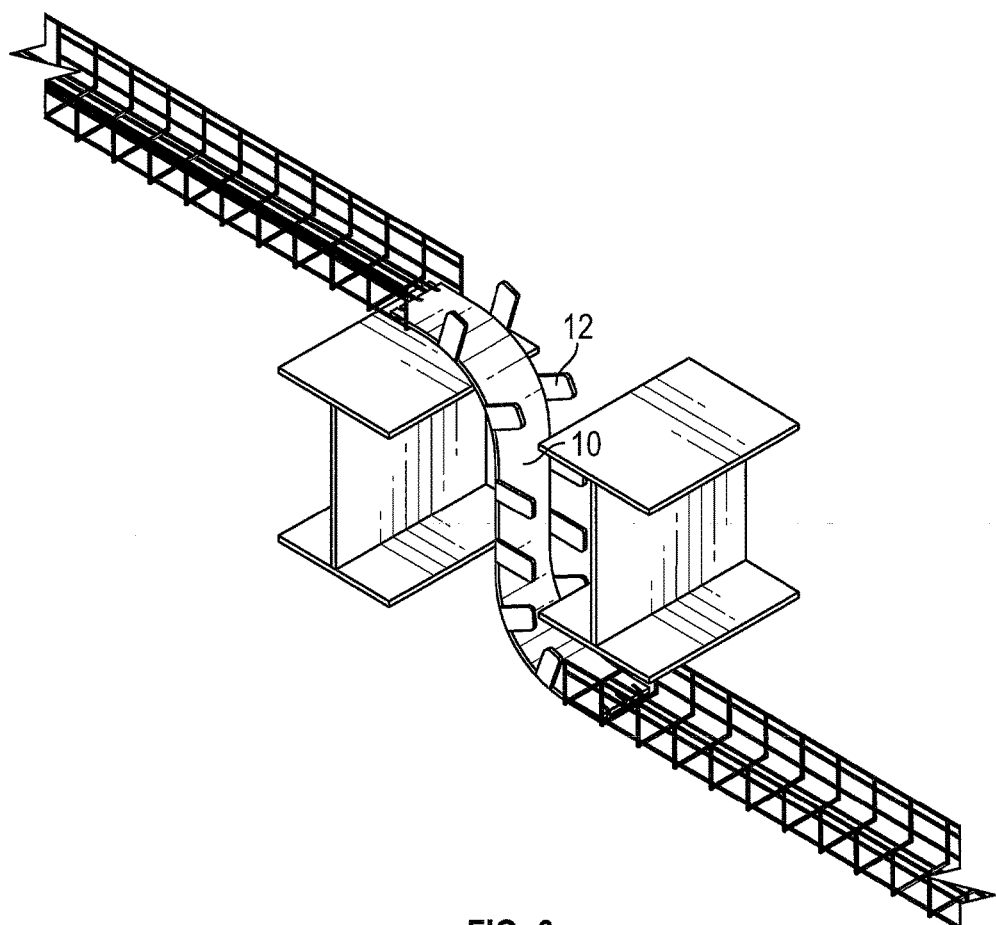
FIG. 6 is a perspective view of a flexible cable tray overpassing a first beam and vertically offset to go under a second beam.
Figure 7:
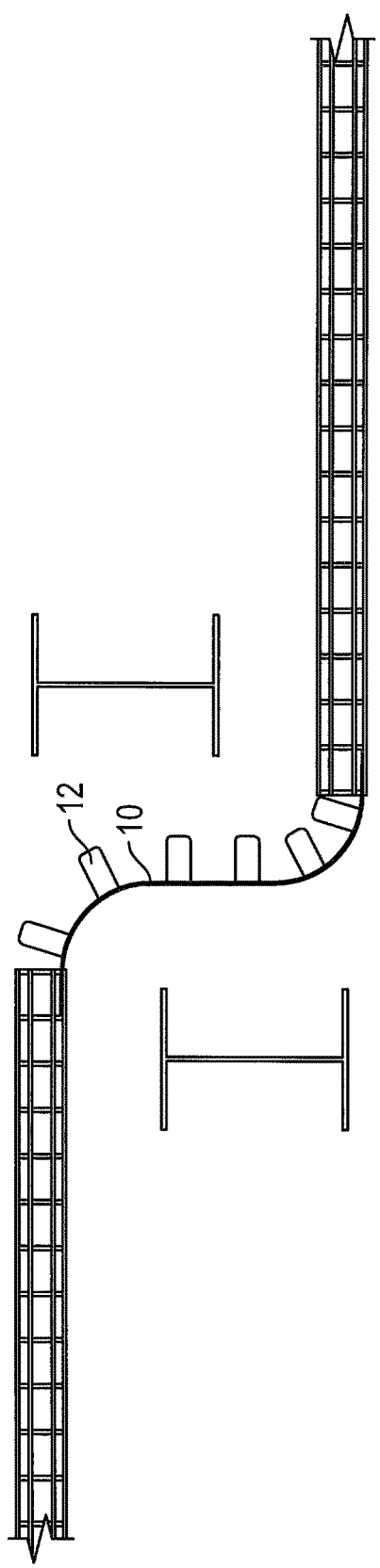
FIG. 7 is a side view of a flexible cable tray overpassing a first beam and vertically offset to go under a second beam as shown in FIG. 6.

As shown generally in FIGS. 1-8, the present invention comprises a flexible cable tray for connecting one or more cable tray sections of a cable tray system. As shown, the cable tray accessory section generally comprises a base 10 combined with one or more tabs or sidewalls 12. The base 10 is flexible or bendable along its length so that a middle portion 30 may be at a different elevation than one or both of the ends 14. Together the base 10 and sidewalls 12 support and guide cables to and from their intended locations through intersections (FIGS. 2 and 3), over beams (FIGS. 4 and 5), and/or under beams then returning to its original elevation (FIGS. 6 and 7). The cable tray can also be used as a vertical offset wherein a change in elevation is needed such as connecting cable trays at different elevations. (FIGS. 6 and 7). In some embodiments the base 10 portion may comprise a rib member or other suitable support 15 combined therewith or fabricated therein to help strengthen the base 10. This is important in embodiments where the base 10 is large and/or in embodiments where the base 10 is used to support an excessive amount of cable weight.

The base 10 and sidewalls 12 may be made of any suitable flexible material including meals and plastics. In one embodiment the material is rigid and flexible with minimal elasticity. This allows the components 10, 12 to be easily bent to a desired angle without the components 10, 12 returning to their original position after force is removed. In one embodiment the base 10 is one continuous member such as a single piece of galvanized metal. In another embodiment the base 10 is comprised of a plurality of separate sections combined at joints which allow each section to pivot relative to the adjacent section.

Figure 8:
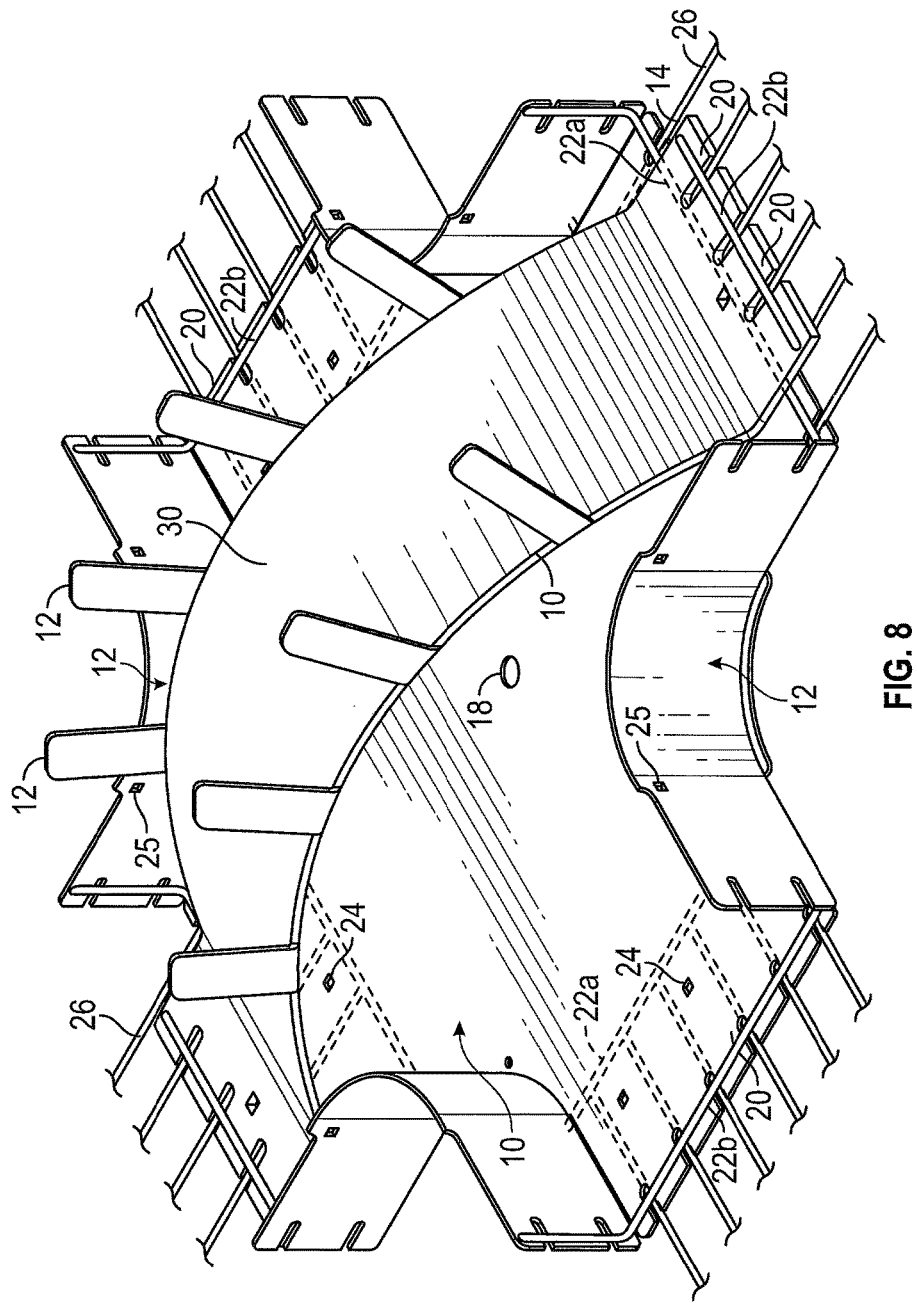
FIG. 8 is a perspective view of a flexible cable tray attached to wire trays.

In the embodiments shown, the cable tray sections are wire mesh cable trays comprising longitudinal members 26 and cross members 22a, 22b, however, any other suitable cable tray may be used. As shown in FIG. 8, the cable tray sections of the cable tray system comprise a plurality of cross members 22a, 22b at regular intervals. In most embodiments, the cross members 22a, 22b are generally perpendicular to the longitudinal axis of the cable tray.

Figure 1:
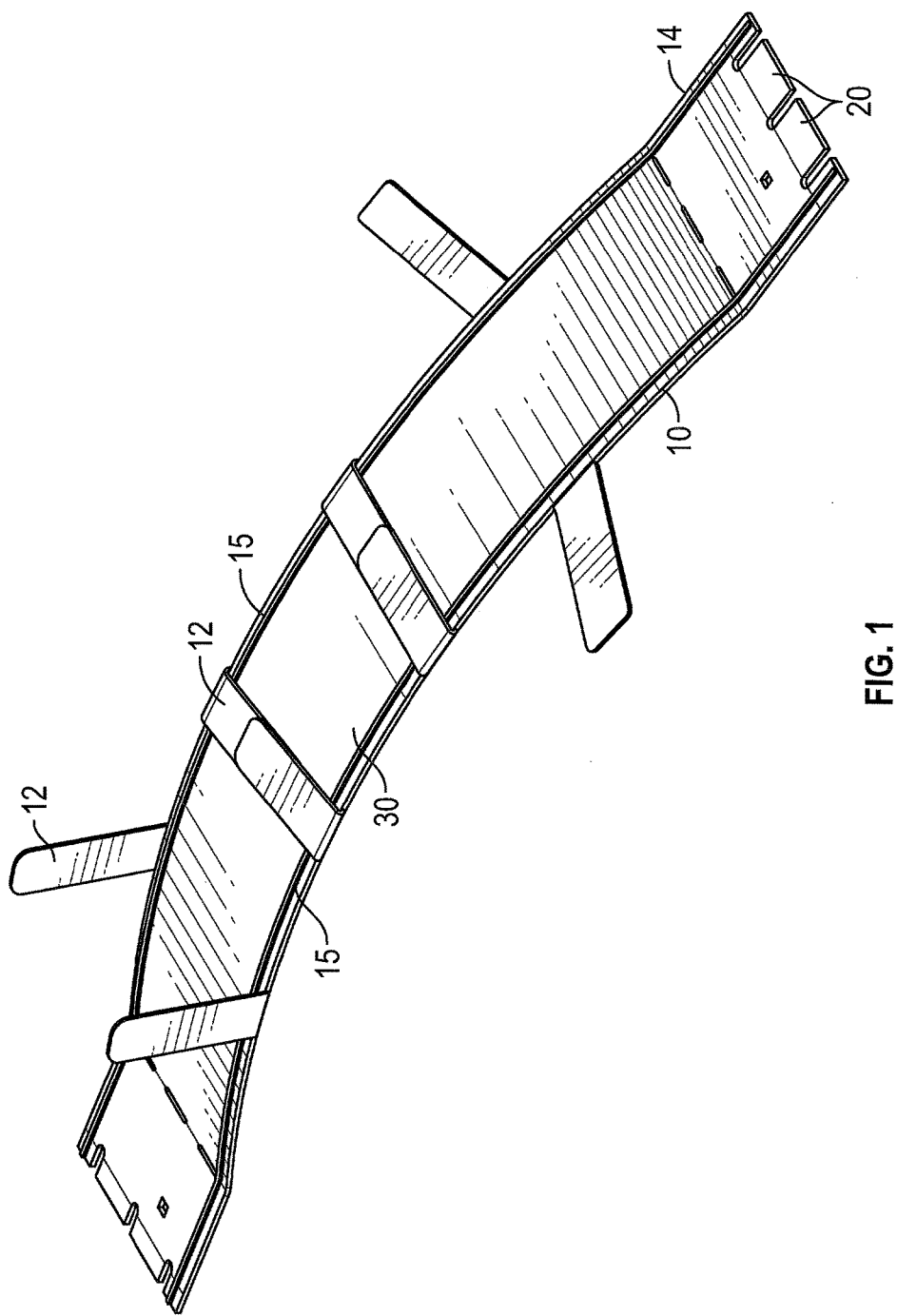
FIG. 1 is a perspective view of a flexible cable tray section.
Figure 2:
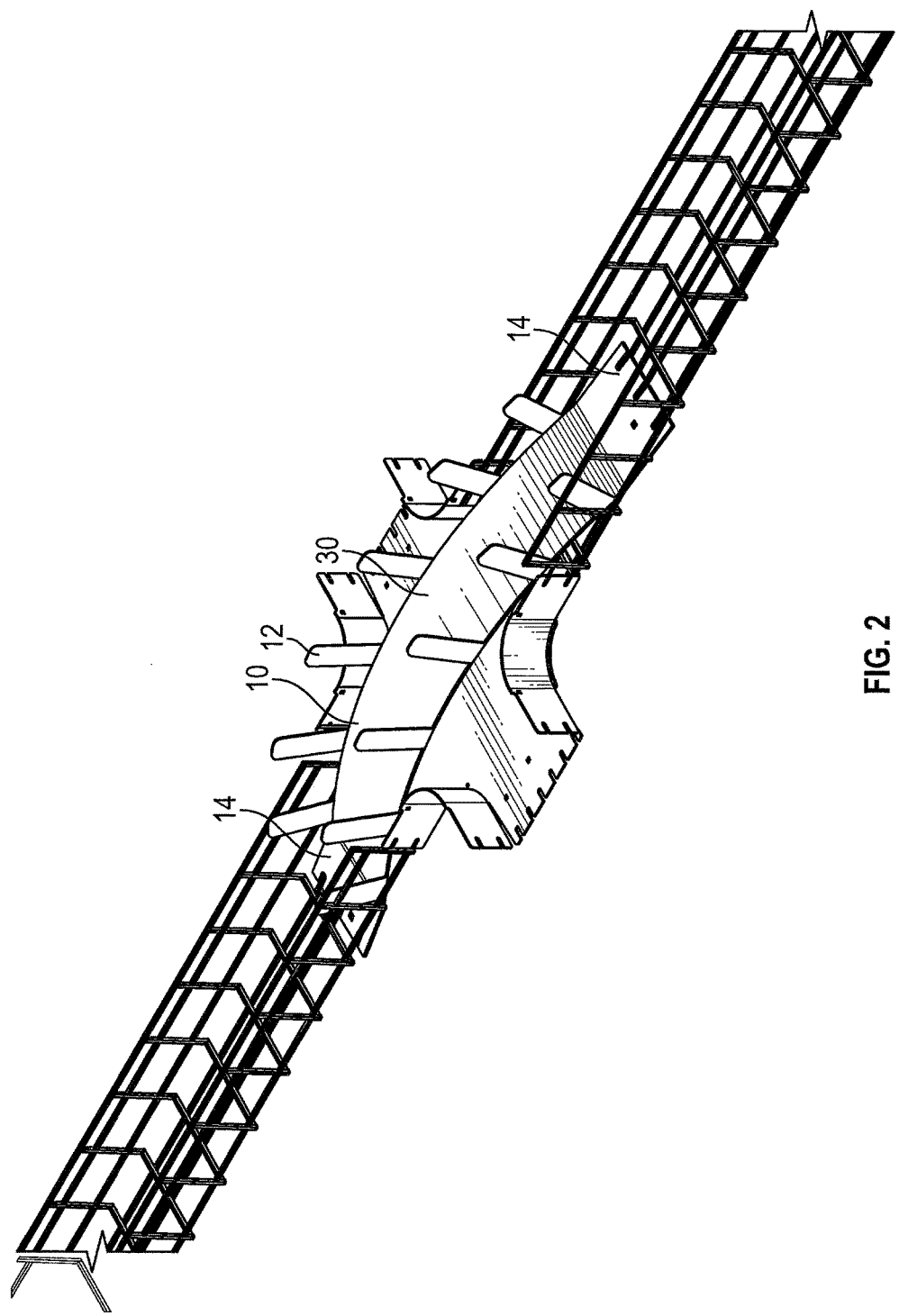
FIG. 2 is a perspective view of a flexible cable tray section over a cable tray having a four-way intersection.
Figure 3:
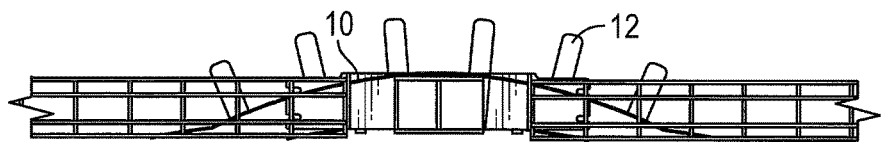
FIG. 3 is a side view showing the flexible cable tray section over a cable tray having a four-way intersection as shown in FIG. 2.
Figure 4:
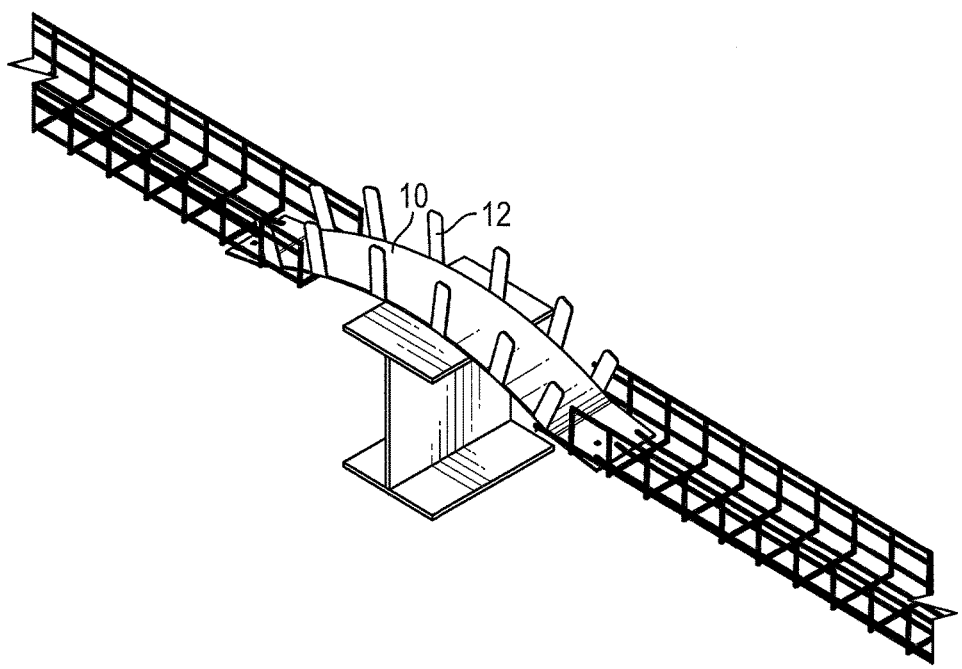
FIG. 4 is a perspective view of a flexible cable tray section overpassing a beam and combined with wire cable trays.
Figure 5:
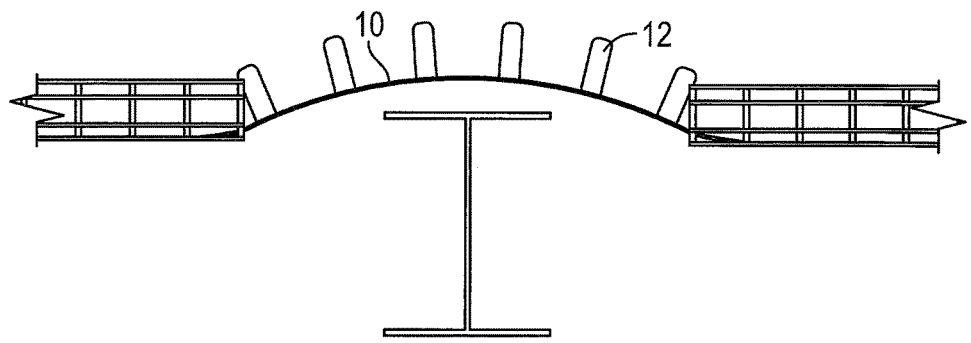
FIG. 5 is a side view of a flexible cable tray section overpassing a beam and combined with wire cable trays as shown in FIG. 4.

In some embodiments, the flexible cable tray includes a means for connecting the flexible cable tray to the cable tray sections. In one embodiment the flexible cable tray is connected to other cable tray sections at one or both of its ends, however, the flexible cable tray is not supported from above or below by a post, wire, or other supporting member. In this embodiment the connection at the end(s) 14 of the flexible cable tray to other cable tray sections is its only connection/support. FIGS. 1-8 show an embodiment wherein the flexible cable tray combines with the cable tray sections by weaving tabs 20 on the ends 14 of the flexible cable tray between cross members 22a, 22b of the cable tray sections. As shown in the figures, the flexible cable tray comprises at least one end 14 adapted to combine with a cable tray section. The ends 14 extend toward the cable tray section (i.e. away from the center of the base 10). Each end 14 has a top side, a bottom side, and at least one tab member 20. The tab member 20 is the outermost portion of the end 14 and it may be flexible in some embodiments as described below. Some flexible cable trays have a single tab member 20 extending from one or more of its ends while others have multiple tab members 20 extending from one or more of its ends 14. FIG. 1 shows a flexible cable tray wherein the base portion 10 has four tab members 20 extending from each of its two ends 14.

To combine the flexible cable tray with the cable tray section, the flexible cable tray tabs 20 are woven or interlocked with a portion of the cable tray section. As discussed above, the cable tray section preferably comprises at least a first cross member 22a spaced apart and generally parallel with a second cross member 22b. As used herein, the first cross member 22a is the one which is located farthest from the end 14 (closest to the center of the base 10) and the second cross member 22b is located closer to the end 14 (farther from the center of the base 10). In some embodiments, the bottom of the base member 10 end 14 is adapted to be placed over the first cross member 22a and the top side of the base member 10 end is adapted to be placed under the second cross member 22b. In other embodiments, the top of the base member 10 end 14 is adapted to be placed under the first cross member 22a and the bottom side of the base member 10 end is adapted to be placed over the second cross member 22b. The former configuration (where the bottom of the base member 10 end is adapted to be placed over the first cross member 22a and the top side of the base member 10 end 14 is adapted to be placed under the second cross member 22b) is preferable since it allows for a smooth transition from the cable tray section to the flexible cable tray without the edge of the flexible cable tray protruding above the cable tray section which might damage the cables. In some embodiments it is the tab member 20 which contacts the second cross member 22b since the tab member 20 is the outermost portion of the end 14.

In some embodiments each tab member 20 is adapted to bend from a first position to a second position relative to its adjacent tab member 20 (if any) and relative to the base 10 of the flexible cable tray. The tab members 20 are biased in their first position. The first cross member 22a creates a support or fulcrum which helps to bias the tab member 20 in its first position as the end of the base member 10 end extends over (or under) it. The tab members 20 are bent to their second position then inserted under (or over) one of the second cross members 22b of the cable tray section to create a friction fit which helps secure the flexible cable tray to the cable tray section. The friction is caused by the tab members 20 pushing against the second cross members 22b as the tab members 20 try to return to their first position.

In the embodiment shown, there is an opening or space on each side of the tab members 20. This opening allows the flexible tray sections to be combined with different sizes and styles of cable trays. For example, some types of tray sections may have their cross members 22a, 22b spaced differently along the length of the cable tray. The opening between tab members 20 allow the cross members 22a, 22b to have different spacing while still allowing a portion of the tab members 20 to fit underneath (or over) the second cross member 22b. The tab members 20 are bent at a sharper angle (relative to their first position) to accommodate cross members 22a, 22b that are closer together and a shallower angle for cross members 22a, 22b that are farther apart. The openings may also align with the longitudinal members 26 of the cable tray section to help hold the flexible cable tray in place relative to the cable tray section. The flexible cable tray tabs 20 may be connected to any of the cross members 22a, 22b, i.e. closer or farther away from the end of the cable tray section to create different angles of connection. For example, connection to the cable tray section where the ends 14 of the flexible cable tray section are closer together will result in more curvature in the middle portion 30 of the flexible cable tray section and connection to the cable tray section where the ends 14 of the flexible cable tray section are father apart will result in less curvature in the middle portion 30 of the flexible cable tray section.

FIG. 8 shows an embodiment wherein the flexible cable tray section is narrower than the cable tray and four-way accessory section. This allows some cables to pass over the flexible cable tray and some to pass along side the flexible cable tray section without passing over the flexible cable tray. This may desirable in some situations where a particular partitioning of cables is desired.

As shown best in FIG. 1, the side walls 12 of the flexible cable tray comprise ends having a top side, a bottom side. The side walls 12 should be of a sufficient width to guide the cable through and maintain the cable within the flexible cable tray. The side walls 12 are flexible/bendable toward and away from the base 10. In one embodiment the walls may be bent down toward the base 10 until they are generally in the same plane as the base 10. This makes the flexible cable tray generally flat which provides for easy shipping and transportation. The walls 12 are then bent back away from the base 10 during installation and use. After installation the side walls 12 may be used to help secure the cables by bending the size walls 12 toward the base 10 at some angle between 0 and 90 degrees. The end walls 12 may be bent so they are contacting the cables in the flexible cable tray but not exerting excessive force against the cables. In another embodiment the end walls 12 may be bent outward to an angel of between 90 and 180 degrees. In this embodiment the end walls 12 are used to effectively expand the width of base 10.

Figure 9:
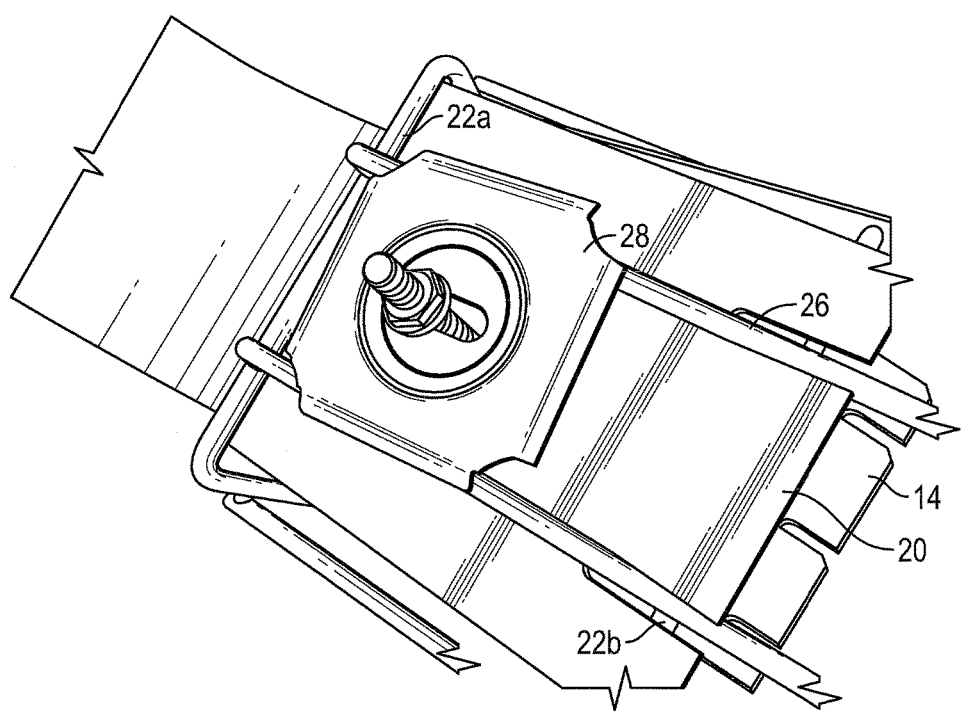
FIG. 9 is a bottom perspective view showing an embodiment having a mechanical fastener to help secure the flexible cable tray to the cable tray section.

As described above, the tab members 20 are the primary means for securing the flexible tray section to the cable tray section. However, some situations require additional fastening means to secure the two components. FIG. 9 shows an embodiment wherein an additional fastener 28 is used to help secure the flexible cable tray to the cable tray section. FIG. 9 shows the underside of an exemplary accessory section. In the embodiment shown, the fastener 28 comprises a backing plate adapted to secure against one or more of the cable tray sections 22, 26. The fastener 28 further comprises a bolt extending through an opening 24 in the cable tray section and the backing plate. The bolt and backing plate mechanically secures the flexible cable tray to the cable tray section.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A flexible cable tray comprising:
    a flexible base member for supporting cables and bendable in one or more configurations, said base member having a first end and a second end and a tab member extending from at least one end, said tab member combined with a cable tray section;
    a plurality of spaced apart flexible sidewalls attached to the base member along the length thereof, said sidewalls being bendable to a desired angle relative to the base member;
    whereby the base member and the sidewalls support and guide cables to and from their intended locations;
    whereby the cable tray section comprises a first cross member and a second cross member; whereby the tab member of the flexible base member has a top side and a bottom side; whereby one of the top side and the bottom side are adapted to face toward the first cross member and the other of the top side and the bottom side are adapted to face toward the second cross member thereby weaving the tab member between the first and second cross members.

2. The flexible cable tray of claim 1 whereby the sidewalls are bent down to lay generally flat with respect to the base member.

3. The flexible cable tray of claim 1 whereby the sidewalls are bent inwardly toward the base member to provide extra support for the cables.

4. The flexible cable tray of claim 1 whereby the base member further includes a rib member to help strengthen the base member.

5. The flexible cable tray of claim 1 whereby the base member has a first end at a first elevation, a bent middle section, and a second end at a second elevation to create a vertical offset.

6. The flexible cable tray of claim 1 whereby the base member has a first end at a first elevation, a bent middle section, and a second end at the first elevation.

7. The flexible cable tray of claim 1 whereby the tab member bends between a first position and a second position and is biased in its first position.

8. The flexible cable tray of claim 1 whereby the tab member bends to its second position when its top side faces toward the first cross member and its bottom side faces toward the second cross member.

9. The flexible cable tray of claim 1 whereby the tab member bends to its second position when its bottom side faces toward the first cross member and its top side faces toward the second cross member.

10. The flexible cable tray of claim 1 whereby more than one tab member extends from the at least one end of the base member and each of the more than one tab members is separated by an opening.

11. The flexible cable tray of claim 1 whereby the base member further comprises an opening adapted to receive a mechanical fastener for mechanically securing the base member to the cable tray section.

12. A flexible cable tray comprising:
    a flexible base member having a length and at least two ends, each end combined with a cable tray section, said cable tray section having first and second cross members, whereby each of the ends has a top side, a bottom side, and at least one tab member;
    a plurality of spaced apart flexible sidewalls attached to the base along the length thereof, said sidewalls being bendable to any desired angle;
    wherein one of the top sides and the bottom sides of the ends are adapted to face toward the first cross member and the other of the top sides and bottom sides are adapted to face toward the second cross member thereby weaving the at least one end between the cable tray section cross members.

13. The flexible cable tray of claim 12 whereby each tab member bends between a first position and a second position and is biased in its first position.

14. The flexible cable tray of claim 12 whereby each tab member bends to its second position when its top side faces toward the first cross member and its bottom side faces toward the second cross member.

15. The flexible cable tray of claim 12 whereby each tab member bends to its second position when its bottom side faces toward the first cross member and its top side faces toward the second cross member.

16. The flexible cable tray of claim 12 whereby the sidewalls are bendable to any angle.

17. The flexible cable tray of claim 12 whereby the sidewalls are bendable to lay generally flat with respect to the base in its unassembled configuration.

18. The flexible cable tray of claim 12 whereby the sidewalls are bendable inwardly toward the base member across the cables in the tray to provide extra support for the cables.

19. The flexible cable tray of claim 12 whereby the tray is bendable along its length to create a vertical offset.

20. The flexible cable tray of claim 12 whereby the sidewalls are bendable outwardly to widen the flexible cable tray.

* * * * *